D. H. CHAMBERLAIN.
Lamp.
No. 2,509. Reissued March 19, 1867.
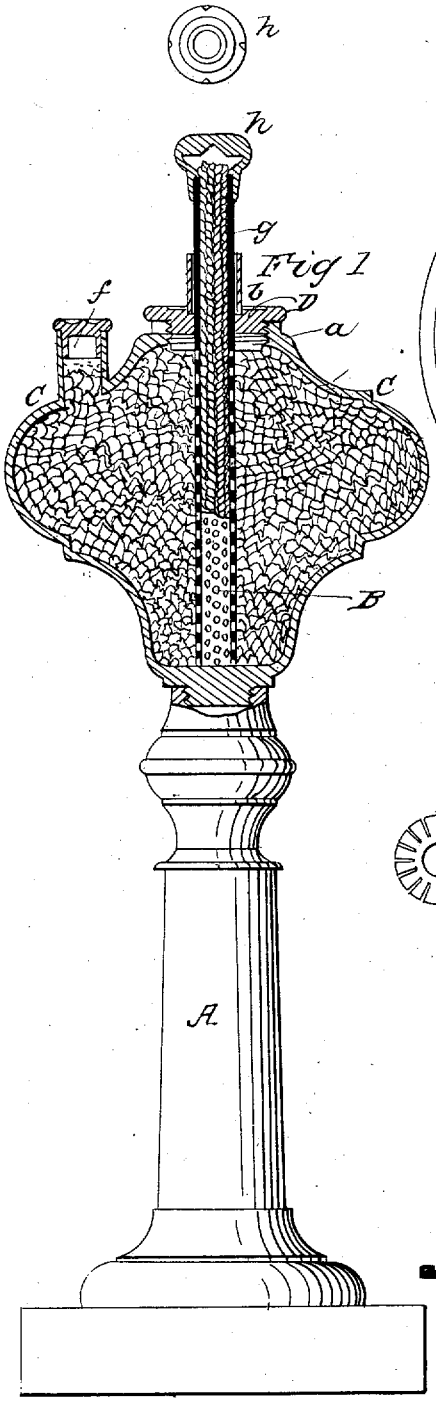
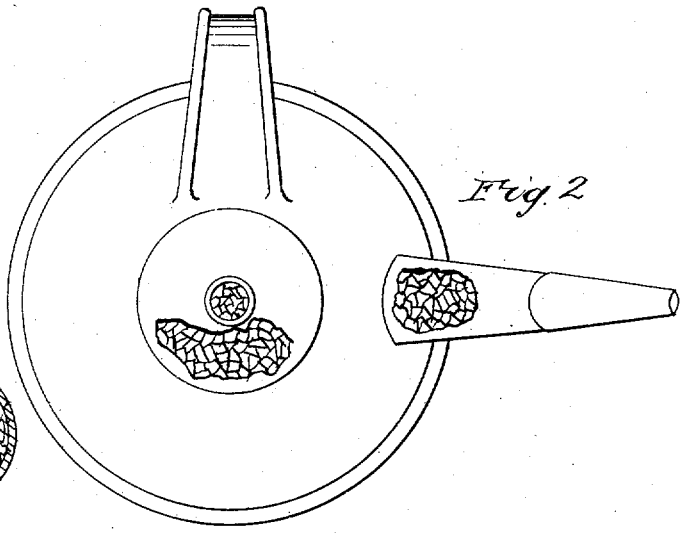
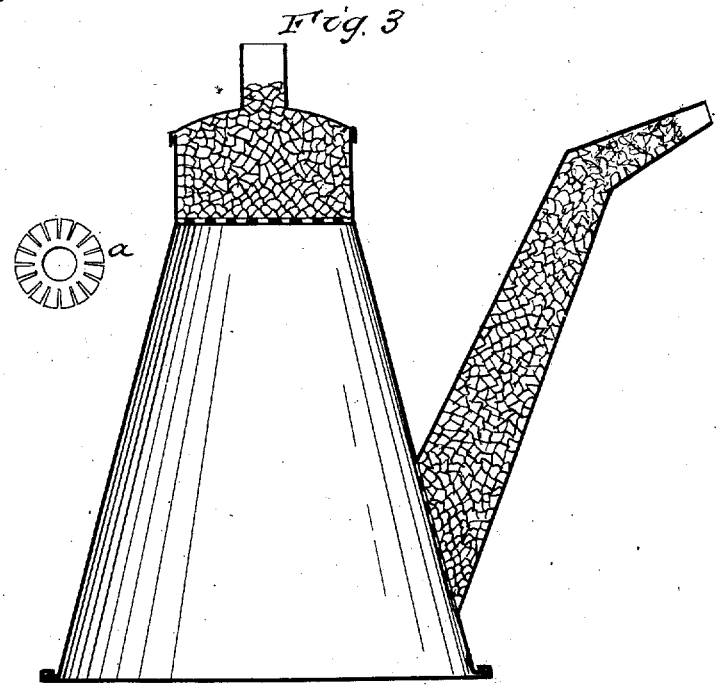
N. PETERS. Photo-Lithographer, Washington, D. C.

United States Patent Office.

WILMON W. BLACKMAR, OF BOSTON, MASSACHUSETTS, ASSIGNEE BY MESNE ASSIGNMENTS OF DEXTER H. CHAMBERLAIN.

*Letters Patent No.* 12,814, *dated May* 8, 1855; *reissue No.* 2,509, *dated March* 19, 1867.

IMPROVEMENT IN LAMPS.

The Schedule referred to in these Letters Patent and making part of the same.

TO ALL WHOM IT MAY CONCERN:

Be it known that DEXTER H. CHAMBERLAIN, of West Roxbury, in the county of Norfolk, and State of Massachusetts, has invented a certain new and useful Method of Preventing Explosions in Lamps used for burning spirit-gas and hydrocarbon oils, also in oil cans for holding the same, of which the following is a full, clear, and exact description, reference being had to the accompanying drawings, making part of this specification, in which—

Figure 1 represents an elevation of a lamp having the improvement applied thereto, the upper portion being shown in section to illustrate more clearly the nature of the invention.

Figure 2 represents a plan; and

Figure 3 a section of an oil can to which the improvement has also been applied.

It has long been desirable to employ for illuminating purposes the various hydrocarbon oils, because of their great economy over the fatty oils when compared with the brilliancy of the light produced. The highly inflammable nature of these oils, however, and their liability to explode when vaporized and mixed with air, have rendered their use extremely dangerous and been the cause of distressing accidents and deaths.

The object of this invention is to remove, in as effectual a manner as possible, the liability to such explosions, and thereby enable consumers to derive the full benefit of these oils for illuminating purposes without the dangers now incident to their use.

The invention, so far as the lamps are concerned, consists in the use of a perforated wick-tube or its equivalent, in combination with a lamp whose oil-chamber is filled with an absorbing material capable of gradually yielding up the oil with which it is saturated to the wick, as the necessities of the flame should require it; and secondly, it consists in combining with the chamber of an oil can or vessel the use of perforated diaphragms, so arranged as to form chambers into which porous materials are to be placed, one of which shall form, as it were, the mouth of the can, and the other the spout, whereby direct communication with the main chamber is cut off from the outer air and from any flame or fire which may surround the can, and thereby preventing all liability to explosion.

The improvement in lamps is represented in the drawings as being applied to that class of lamps known as "spirit or burning-fluid gas lamps," but it may be applied to any and all kinds of lamps used for the consumption of volatile oils; hence the general detail of the lamp here is unnecessary, and the description therefore confined to such parts of the lamp as are requisite to understand the invention.

A represents the standard which supports the oil-chamber C, and which is secured to it by screw or otherwise. Through the centre of this chamber C is passed a perforated wick-tube, B, and secured to the bottom of the oil-chamber C by solder or otherwise. This wick-tube is perforated all round with a number of small holes to within a short distance of the inner side of the mouth cover D, so as to allow free passage to the oil through the wick-tube to the wick *g*. The wick is passed down through the length of the wick-tube or chamber B to the bottom of the oil-cup, so as to absorb the last drop of oil. In the drawing it is not so represented, it being cut short in order to represent the openings or holes in the wick-tube B. The wick-tube or chamber having been perforated and secured to the oil-chamber C, the latter is then entirely filled with some absorbing material, such as ground pumice-stone of the size of very small shot, or with any other porous or absorbing material, fibrous or otherwise, but as a general rule with ground pumice-stone. When thus filled, the lamp is ready to receive the oil, which may be either done through the mouth of the lamp before the cap-piece D is screwed on, or through another opening, *f*, which may be formed for that purpose in the side of the chamber C. A lamp thus constructed is incapable of explosion.

It will be obvious that various modifications of this invention may be made without altering in any degree the principle, but they are not deemed unprotected because considered unnecessary here to be described.

In figs. 2 and 3 is shown the method of preventing explosions in the oil cans used for holding this class of oils. E represents the main oil-chamber provided, as usual, with mouth, *a*, and spout, *b*, the latter being separated from the chamber E by a perforated diaphragm, *c*, and then filled with a porous or absorbing material, *g*, thus cutting off direct communication with the oil-chamber and outer air. Another diaphragm, perforated like the other, may be inserted in the mouth of the spout above the porous material, if deemed advisable. In the upper part of the chamber E is secured a perforated plate, *e*, forming a separate chamber, *h*, which is filled with ground pumice-stone the size of small shot, or some other porous material, as in the spout *b*, through which the oil, in filling the can, is made to filter, and in this way protecting the oil, after it has been filled in, from external flame, and consequent explosion of the can.

Having thus described the invention, what is claimed as new, and desired to be secured by Letters Patent, is—

1. The combination of a perforated wick-tube or chamber B, with the body C of a lamp filled with a porous or absorbing material, for the purposes set forth.

2. An oil can, constructed in the manner and for the purposes set forth.

WILMON W. BLACKMAR,
*Assignee of the Patent granted to Dexter H. Chamberlain May* 8, 1855.

Witnesses:
S. EDWIN IVESON,
HERBERT SLEEPER.